(12) United States Patent
Zhang et al.

(10) Patent No.: US 9,160,003 B2
(45) Date of Patent: Oct. 13, 2015

(54) POLYSILOXANE BINDER FOR LITHIUM ION BATTERY ELECTRODES

(75) Inventors: Zhengcheng Zhang, Naperville, IL (US); Jian Dong, Sun Prairie, WI (US); Khalil Amine, Oak Brook, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 850 days.

(21) Appl. No.: 13/331,110

(22) Filed: Dec. 20, 2011

(65) Prior Publication Data

US 2012/0153219 A1    Jun. 21, 2012

Related U.S. Application Data

(60) Provisional application No. 61/425,547, filed on Dec. 21, 2010.

(51) Int. Cl.
| | | |
|---|---|---|
| *H01M 4/62* | (2006.01) | |
| *H01M 4/60* | (2006.01) | |
| *H01M 4/134* | (2010.01) | |
| *C08G 77/46* | (2006.01) | |

(52) U.S. Cl.
CPC ............. *H01M 4/622* (2013.01); *H01M 4/134* (2013.01); *H01M 4/602* (2013.01); *H01M 4/621* (2013.01); *C08G 77/46* (2013.01); *Y02E 60/122* (2013.01)

(58) Field of Classification Search
CPC ......... H01M 4/60; H01M 4/62; H01M 4/602; H01M 4/622
USPC .......................... 429/212, 217, 523, 530, 209
See application file for complete search history.

(56) References Cited

U.S. PATENT DOCUMENTS

| | | | |
|---|---|---|---|
| 2005/0019656 A1* | 1/2005 | Yoon et al. | ..................... 429/217 |
| 2005/0106470 A1 | 5/2005 | Yoon et al. | |
| 2005/0170254 A1 | 8/2005 | West et al. | |
| 2009/0305139 A1 | 12/2009 | Oh et al. | |
| 2010/0047693 A1 | 2/2010 | Yang et al. | |

FOREIGN PATENT DOCUMENTS

| | | | | |
|---|---|---|---|---|
| JP | 11224669 A | * | 8/1999 | .............. H01M 4/62 |
| JP | 2003-109596 | | 4/2003 | |
| JP | 2004-134208 | | 4/2004 | |
| KR | 2003-0032364 | | 10/2001 | |
| KR | 2002-0062193 | | 7/2002 | |
| KR | 10-2006-0001719 | | 1/2006 | |
| WO | WO 00/07253 | | 2/2000 | |
| WO | WO-2008/023895 | | 2/2008 | |
| WO | WO-2008/030001 | | 3/2008 | |

* cited by examiner

*Primary Examiner* — Khanh Tuan Nguyen
*Assistant Examiner* — Haidung Nguyen
(74) *Attorney, Agent, or Firm* — Foley & Lardner LLP

(57) ABSTRACT

An electrode includes a binder and an electroactive material, wherein the binder includes a polymer including a linear polysiloxane or a cyclic polysiloxane. The polymer may be generally represented by Formula I:

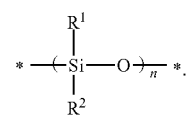

I

16 Claims, 2 Drawing Sheets

POLYSILOXANE BINDER FOR LITHIUM ION BATTERY ELECTRODES

CROSS-REFERENCE TO RELATED PATENT APPLICATIONS

This application claims the benefit of Provisional Application U.S. Application 61/425,547, filed Dec. 21, 2010, which is incorporated herein by reference in its entirety for any and all purposes.

GOVERNMENT RIGHTS

The United States Government has rights in this invention pursuant to Contract No. DE-AC02-06CH11357 between the United States Government and UChicago Argonne, LLC, representing Argonne National Laboratory.

FIELD

The present invention is generally directed to electrochemical cells.

BACKGROUND

Lithium ion batteries having high energy density and high voltage are commercially available and widely used as electrical power for consumer electronics, medical, military and vehicles. Such batteries generally use a lithium transition metal oxide as a cathode active material and a graphite-based material as an anode active material. However, graphite-based anode materials have a theoretical capacity of only 372 mAh/g, thus suffering from limited capacity. Consequently, such graphite-based anodes are incapable of carrying out a sufficient role as an energy source for next-generation mobile equipment undergoing rapid development and advancement. Further, lithium metals, studied for use as the anode material, have a very high energy density and thus may realize a high capacity, but raise problems associated with safety concerns due to growth of dendrites and a shortened cycle life as charge/discharge cycles are repeated. Use of alternative, carbon-based electrodes, such as carbon nanotubes (CNTs), has been attempted as an anode active material, but various problems have been pointed out such as low productivity, expensiveness and low initial efficiency of less than 50%.

A number of studies have been recently proposed as to silicon, tin or alloys thereof, as they are known to be capable of performing reversible absorption (intercalation) and desorption (deintercalation) of large amounts of lithium ions through the chemical reaction with lithium. For example, silicon (Si) has a maximum theoretical capacity of about 4020 mAh/g (9800 mAh/cc, a specific gravity of 2.23), which is substantially greater than the graphite-based materials, and thereby is promising as a high-capacity anode material. However, when such silicon or tin materials are used as electrodes with conventional binders such as, for example polyvinylidene fluoride (PVdF) or styrene butadiene rubber (SBR), upon performing charge/discharge processes, the silicon and tin materials react with lithium. As a result of the reaction, the electrode undergoes significant changes in volume that can range from 200% to 300%. Due to such volume changes, repeated charge/discharge may result in separation of the anode active material from the current collector, or significant physicochemical changes at contact interfaces between the anode active materials, which are accompanied by increased resistance. As charge/discharge cycles are repeated, the battery capacity drops significantly, thereby shortening the cycle-life of the battery.

Increasing the amount of the binder can mitigate the volume changes can decrease separation of the material from the current collector, however, the electrical resistance of the electrode is increases. This leads to complications due to reduced battery capacity.

One suggested solution is use a polyvinyl alcohol or thermosetting plasticized polyvinyl alcohol having good adhesive strength as the binder. See JP Patent Publication Nos. 1999-67216, 2003-109596 and 2004-134208. However, such binders exhibit low viscosity, non-uniform application of the binder on copper foil as a current collector and processing problems associated with thermal treatment necessary to improve adhesion between the electrode mix and the current collector. WO 2000-007253 discloses a binder which includes a combination of polyvinyl alcohol and polyurethane. Korean Patent Application Publication No. 2006-001719 discloses a method of preparing an anode active material for a lithium secondary battery, using a resin composite which is prepared by coating graphite and at least one of Si, Sn and Al with a fixing agent such as a polyvinyl alcohol resin, a urethane resin, or the like. In connection with the preparation of the cathode for a lithium-sulfur secondary battery, Korean Patent Application Publication No. 2003-0032364 discloses a technique which involves preparation of an active material including a conductive material by binding between the sulfur active material and the conductive material using a combination of polymers, including polyvinyl alcohol and polyurethane as a first binder, and employs a second binder component insoluble in the solvent of the first binder, as a binder between the active materials including the conductive material and between the active material and the current collector.

Korean Patent Application Publication No. 2002-062193 discloses a semi-interpenetrating polymer network (semi-IPN) formed by the combination of a polyvinyl alcohol derivative and a compound having crosslinkable functional group(s), as a binder, wherein the polyvinyl alcohol derivative is a polymer compound having an oxyalkylene chain-containing polyvinyl alcohol unit in which hydroxyl groups are partially or completely substituted by oxyalkylene-containing groups, and compounds having two or more reactive double bonds are exemplified as the compound having crosslinkable functional group(s). However, partial or complete substitution of hydroxyl groups of polyvinyl alcohol leads to significant deterioration in physical properties of the polyvinyl alcohol, thus failing to express a desired level of adhesive strength.

SUMMARY

In one aspect, a binder for an electrode composition is provided. The binders exhibit excellent elongation percentage and having improved electrolyte resistance. The binders also exhibit superior adhesive strength between active materials and between the active materials and the current collectors. The binders aid in suppression of volumetric changes of electrodes occurring during charge/discharge cycles, which help in minimizing or preventing electrode cracking. The binders allow for fabrication of batteries having an excellent charge/discharge efficiency and long service lifetimes.

DETAILED DESCRIPTION

Figure 1:
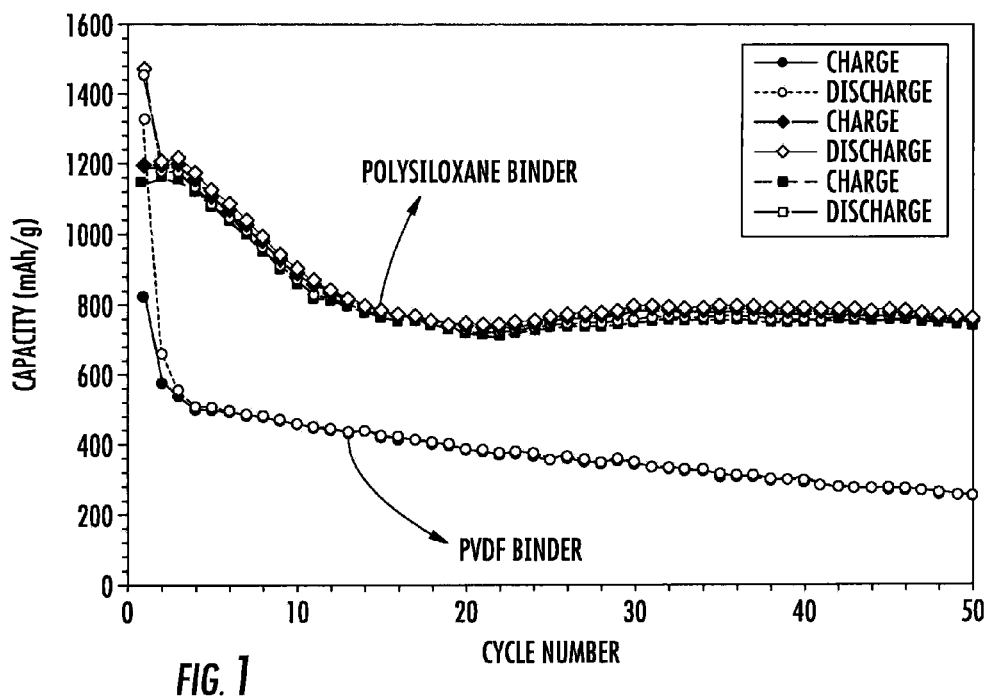
FIG. 1. is a graph of the specific capacity of a nanosilicon anode/Li half cell versus cycle number (red: inventive binder; black: PVdF binder), according to one embodiment.
Figure 2:
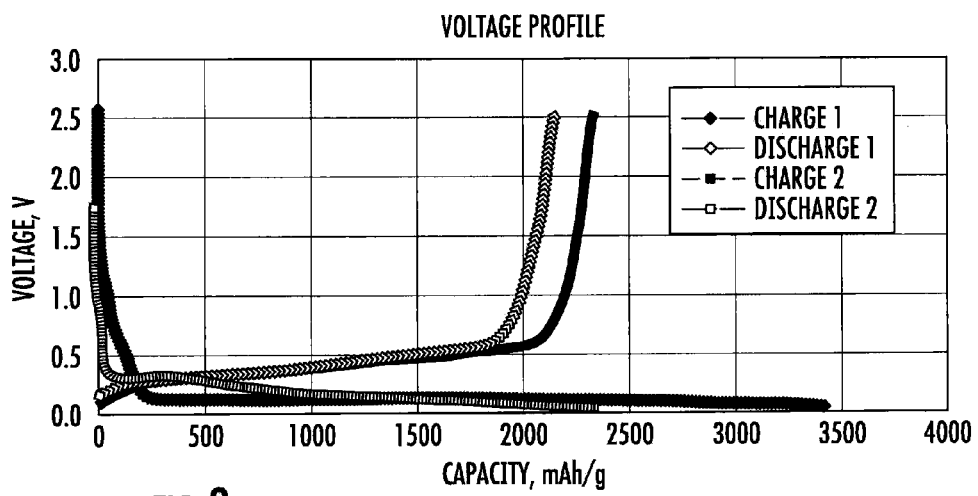
FIG. 2 is a graph of the first and second charge/discharge profiles of a silicon anode with polysiloxane binder, according to the examples.
Figure 3:
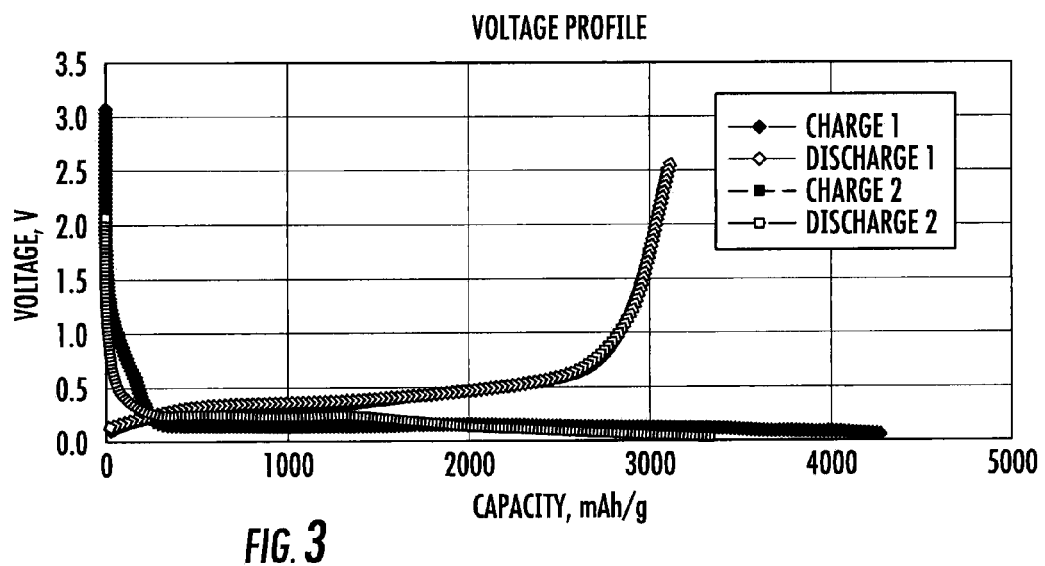
FIG. 3 is a graph of the first and second charge/discharge profiles of a silicon anode with polysiloxane/polyimide blended binder, according to the one embodiment.
Figure 4:
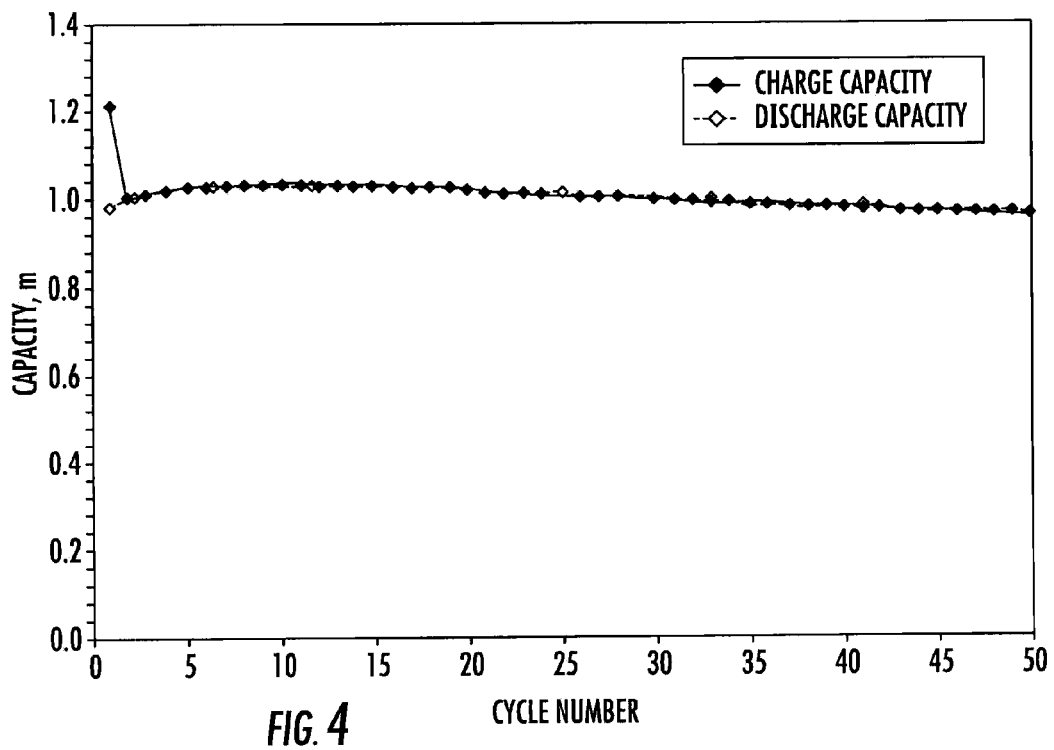
FIG. 4 is a graph of the specific capacity of a $LiNi_{1/3}Mn_{1/3}Co_{1/3}O_2/Li$ half cell versus cycle number, using a polysiloxane binder according to one embodiment.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

In one aspect, linear or cyclic polysiloxane polymers are used as binders for electroactive materials for electrodes. In some embodiments, the binders are cross-linked. In some embodiments, the binders are formed by a crosslinkable polysiloxane and a multifunctional cross-linker initiated by thermal or photo reaction. The curable polysiloxane precursor and cross-linker are mixed into the conventional slurry process and can be thermally cured or UV cured at the end of the coating process. The polysiloxanes may include oligo(ethylene glycol) groups that pendant off of the polymer backbone. Such oligo(ethylene glycol) groups impart an internal plasticizing effect to the polymer. The free-standing polymers show high room temperature conductivity, at least in part due to the highly conductive oligo(ethylene glycol) chains which exhibit vigorous segmental motion of the pendant oligo(ethylene glycol) groups as well as the high flexibility of the Si—O backbone. Thus, while the polysiloxanes are solid materials, they remain highly flexible. In some embodiments, the polysiloxane binders may be blended with polyimides, and other polymers which may be binders and have good electrode binder properties.

In another aspect, the slow cure rate existing in the current cross-linking polymer electrolyte systems is addressed. Such cure rates are typically greater than 2 hours at elevated temperature to go achieve completion, and battery and electrolyte components tend to degrade at such temperatures over time. Thus, in one embodiment, a fast-cure method for the polysiloxanes by formulating an initiating promoter to the cross-linking initiation system. At room temperature the initiation system is relatively stable and can provide more than 12 hours pot-life or shelf-life. At elevated temperature, the added promoter can accelerate the decomposition of the initiator to release the active species simultaneously when subjected to heating. This leads to curing of the gel polymer electrolyte in seconds.

According to some embodiments, the polysiloxane is a linear or cyclic polymer of general Formula I:

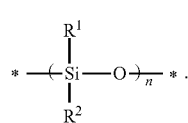

In the polysiloxane, each $R^1$ and $R^2$ is independently an alkyl group, an epoxy group, a carbonate group, a carboxyl group, an oxalic group, or a polyether group. In the polysiloxane, the number of repeat units in the polymer, n and n', may be varied to adjust the viscosity of the polymer. For example, n represents the repeating number of Si—O units and n is typically greater than about 30. In some embodiments, n is from about 35 to about 1000. In other embodiments, n is from about 40 to about 100. In yet other embodiments, n is from about 50 to about 60.

In terms of actual molecular weight, the absolute values will vary depending upon the side groups for the polysiloxanes. However, the molecular weight will be one in which the polysiloxane is a solid or a viscous polymer for use as a binder so that it holds the active material to the current collector. In some embodiments, the molecular weight is greater than about 6000 g/mol. In some embodiments, the molecular weight is from about 7000 g/mol to about 200,000 g/mol. In other embodiments, the molecular weight is from about 8000 g/mol to about 20,000 g/mol. In other yet embodiments, the molecular weight is from about 10,000 g/mol to about 12,000 g/mol.

In some embodiments of Formula I, C For example, the polysiloxane may be represented by Formula IA:

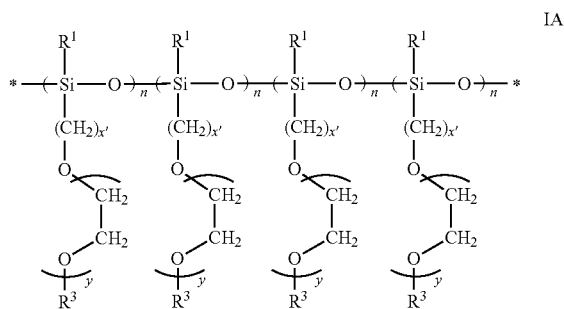

In Formula IA, $R^3$ is H or alkyl; x' is from 0-12; and y is from 1 to 20. In the formula, n represents the individual repeat units of the polymer, which may be in a random order. For example, in some embodiments of Formula IA, each $R^1$ is independently methyl, ethyl, or propyl; $R^3$ is H, methyl, ethyl, or propyl; x' is 2 or 3; and y is from 2 to 7. In one embodiment, $R^1$ is methyl; $R^3$ is methyl; x' is 3; and y is 3.

In some embodiments of Formula I, $R^1$ is an alkyl group, and $R^2$ is an alkyl or a polyether group. For example, the polysiloxane may be represented by Formula IB:

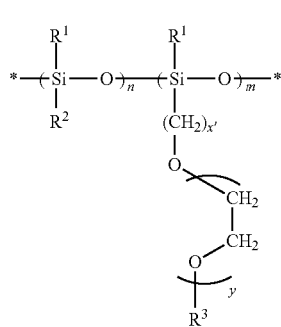

In Formula IB, $R^3$ is H or alkyl; $R^2$ is alkyl; x' is from 0-12; and y is from 1 to 20. In the formula, n and m represent the repeat units of the polymer, which may be in a random order. For example, in some embodiments of Formula IB, each $R^1$ is independently methyl, ethyl, or propyl; each $R^2$ is independently methyl, ethyl, or propyl; $R^3$ is H, methyl, ethyl, or propyl; x' is 2 or 3; and y is from 2 to 7. In one embodiment, $R^1$ and $R^2$ are methyl; $R^3$ is methyl; x is 3; and y is 3. The actual values for m and n will vary depending upon the size of the polysiloxane, which will be a solid for use as a binder, as described above with respect to n and the molecular weights of the polysiloxanes.

In some embodiments of Formula I, $R^1$ is an alkyl group, and $R^2$ is an alkyl or a polyether group. For example, the polysiloxane may be represented by Formula IC:

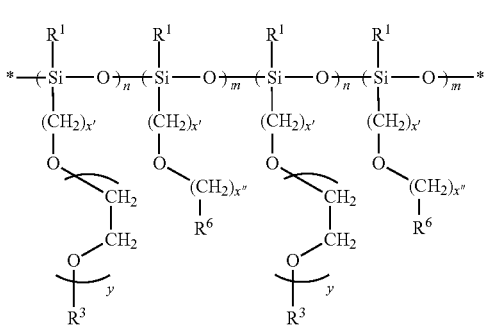

IC

In Formula IC, $R^3$ is H or alkyl; $R^6$ is a cyclic carbonate; x' is from 0-12; x" is from 1 to 12; and y is from 1 to 20. In the formula, n and m represent the repeat units of the polymer, which may be in a random order. For example, in some embodiments of Formula IC, each $R^1$ is independently methyl, ethyl, or propyl; each $R^6$ is 1,3-dioxolane-2-one (i.e. ethylene carbonate); $R^3$ is H, methyl, ethyl, or propyl; x' is 2 or 3; x" is 1 to 4; and y is from 2 to 7. In one embodiment, $R^1$ and $R^2$ are methyl; $R^3$ is methyl; x' is 3; x" is 1; and y is 3.

In some embodiments of Formula I, the compound may be represented by Formula ID:

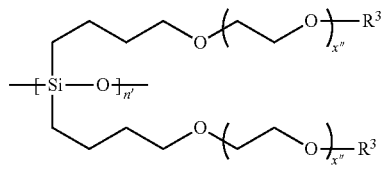

ID

In Formula ID, each $R^3$ is independently an alkyl group having 1 to 12 carbon atoms; each x" individually represents a numeral from 1 to 12; n represents a numeral of 10 to 200.

The presence of the polyether chains in Formula I can provide dual functions. For example, as one function, the polyether side chains provide chelating sites for the $Li^+$. As another function, the polyether side chains promote $Li^+$ transportation through the solid polysiloxane due to segmental chain movement. This allows for more efficient transfer of the charge carrying species throughout a device which includes polysiloxanes as a binder.

The presence of other types of groups as side chains on the polysiloxanes may be used to increase the adhesion of the polysiloxanes to a current collector. For example, where the current collector is a metal, such as but not limited to aluminum, steel, gold, copper, silver, platinum, nickel, palladium, and the like, the side chains may include epoxy groups which may be ring opened to provide for a epoxide binding to the current collector surface. Additionally, or alternatively, a more polar group may be introduced onto the polysiloxane backbone through chemical modification. Polar groups such as carbonate units may be included in the polysiloxane side chains to also increase adhesion of the polymer to the current collector.

The polysiloxane binder can also be cross-linked chemically, thermally or by UV irradiation to increase the bonding strength to the metal substrate. Additionally, the cross-linking reaction can be completed in a very fast manner, which can significantly reduce the cost for the electrode fabrication.

In one such embodiment, the polymer binder may include an epoxy group which may be cross-linked (in addition or alternatively to the use of the epoxy group described above for adhesion of the polysiloxane to the current collector surface). Such polymers may be prepared by the Pt-catalyzed hydrosilylation reaction between a —Si—H group and an epoxy-containing group with an unsaturated bond, such as allyl glycidyl ether ($C_6H_{10}O_2$), methallyl glycidyl ether ($C_7H_{12}O_2$), vinyl glycidyl ether ($C_5H_8O_2$), glycidyl crotonate ($C_7H_{10}O_3$), or glycidyl allyl acetate ($C_8H_{12}O_3$). This binder precursor can be easily cured by an agent. The curing agent can be a low-molecular weight curing agent ordinarily used in epoxy resins, including: amines, such as diethylenetriamine, triethylenetetramine, ethylenediamine, and tetraethylenepentamine; acid anhydrides, such as phthalic anhydride, succinic anhydride and pyromellitic anhydride.

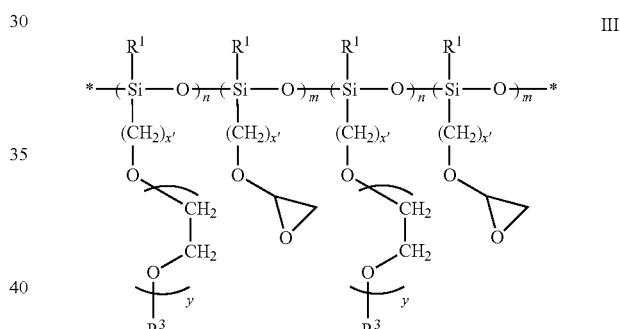

III

In Formula III, each $R^1$ is independently an alkyl group; $R^3$ is H or alkyl; x' is from 0-12; and y is from 1 to 20. In the formula, n and m represent the repeat units of the polymer, which may be in a random order. For example, in some embodiments of Formula III, each $R^1$ is independently methyl, ethyl, or propyl; $R^3$ is H, methyl, ethyl, or propyl; x' is 2 or 3; and y is from 2 to 7. In one embodiment, $R^1$ and $R^3$ are methyl; x' is 3, and y is 3. The polymer of Formula III may have a molecular weight of greater than 6,000 g/mol. In some embodiments, the molecular weight of the polymer of Formula III is from about 6,000 g/mol to about 200,000 g/mol.

In another embodiment, a crosslinkable polymer binder may have two separate continuous phases that are compatible with each other. For example, one of the phases may be a crosslinked polymer that ensures its mechanical strength and chemical stability, and the other is an ionic alloy conducting phase. The crosslinking phase can also assist lithium salt dissolution and transportation.

The polysiloxanes may also be highly branched siloxane polymers having one or more poly(ethylene oxide) groups as a side chain as illustrated in the Formulas IA, IB, IC, and ID. The polyether group is directly grafted to silicon atoms on the siloxane polymer backbone. This kind of branched type siloxane polymer is stably anchored in the network structure and provides continuous conducting paths in all directions throughout the IPN solid polymer electrolyte. The branched type siloxane polymer can coordinate with the lithium cation and has the required flexibility to transport the lithium ions. Through the fabrication methods provided herein, the polysiloxane is well anchored in the IPN polymer electrolyte and increases the polymer ionic conductivity by its high segmental mobility.

According to some embodiments, the siloxane polymers have oligo(ethylene oxide) groups as side chains and the branched type siloxane polymers represented by the Formula ID and IE are specific examples of the present invention:

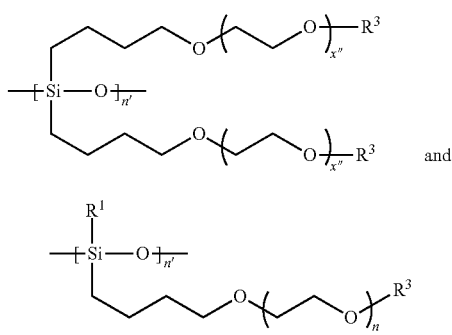

In Formulas ID and IE, each $R^3$ is independently an alkyl group having 1 to 12 carbon atoms; each x" individually represents a numeral from 1 to 12; n and n' individually represent a numeral from 1 to 200. In some embodiment, n and n' individually represent a numeral from 10 to 200.

One example of a crosslinking agent may be represented by Formula VII:

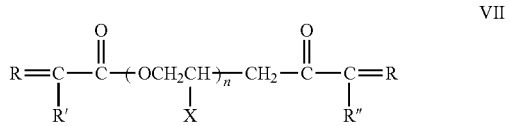

In Formula VII, R represents an alkyl group having 1 to 10 carbon atoms; and each of R' and R" represents H, an alkyl group having 1 to 10 carbon atoms, or an alkenyl group having 2 to 12 carbon atoms; X is H or a methyl group; and n represents numeral of 1 to 15. According to some embodiments, a monomer used for the control of the crosslinking density of the binder may be represented by Formula VIII:

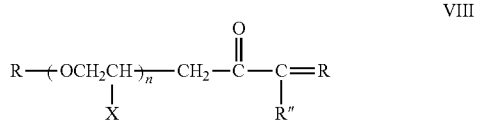

In Formula VIII, each of R and R' is independently an alkyl group having 1 to 10 carbon atoms; and R" is H, an alkyl group having 1 to 10 carbon atoms, or an alkenyl group having 2 to 12 carbon atoms; X is H or a methyl group; and n represents numeral of 1 to 20.

In some embodiments, the crosslinking agent is present from about 10 wt % to about 50 wt %, wherein the wt % is calculated on the total weight of the at least one oligo(ethylene glycol) functionalized polysiloxane, the at least one crosslinking agent, the at least one monofunctional monomeric compound, the at least one radical reaction initiator, and the at least one radical initiator promoter. In some such embodiments, the crosslinking agent is present from about 10 wt % to about 20 wt %. In some embodiments, the monofunctional monomeric compound is present from about 10 wt % to about 50 wt %, wherein the wt % is calculated on the total weight of the binder and active agent.

In some other embodiments, the polysiloxanes can be rapidly formed by high energy electron beam initiated crosslinking reaction at room temperature. In one embodiment, photoinitiation by UV light of cross-linking polysiloxane as binders is shown as:

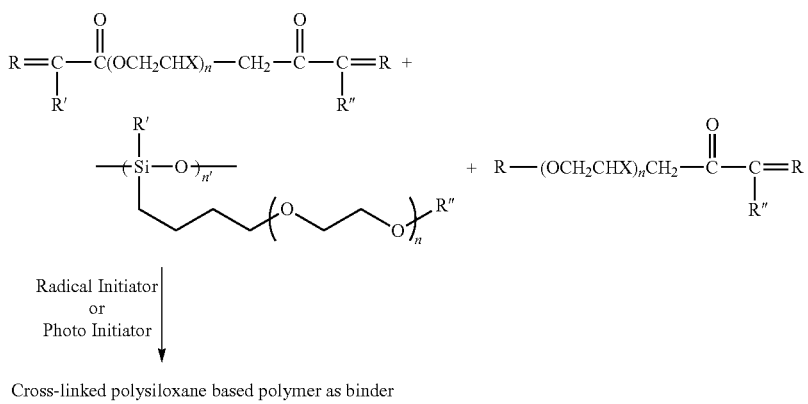

Cross-linked polysiloxane based polymer as binder

Formation of the cross-linked binders may be initiated by thermal, photo and/or UV initiator, electron beam or ionic beam. Representative thermal initiators include, but are not limited to, an azo compound, a peroxide compound, bismaleimide, or a mixture of any two or more thereof. Illustrative azo compounds include, but are not limited to, 1,1'-azobis (cyclohexanecarbonitrile); 2,2'-azobis(2-methylpropionamidine) dihydrochloride; 2,2'-azobis(2-methylpropionitrile); and 4,4'-azobis(4-cyanovaleric acid). Illustrative peroxide compounds include, but are not limited to, benzoylperoxide; 1,1-bis(tert-amylperoxy)cyclohexane; 1,1-bis(tert-butylperoxy)-3,3,5-trimethylcyclohexane; 1,1-bis(tert-butylperoxy) cyclohexane; 2,2-bis(tert-butylperoxy)butane; 2,4-pentanedione peroxide; 2,5-bis(tert-butylperoxy)-2,5- dimethylhexane; 2,5-di(tert-butylperoxy)-2,5-dimethyl-3-hexyne; 2-butanone peroxide; cumene hydroperoxide; di-tert-amyl peroxide; dicumyl peroxide; lauroyl peroxide; tert-butyl hydroperoxide; tert-butyl peracetate; tert-butyl peroxide; tert-butyl peroxybenzoate; and tert-butylperoxy 2-ethylhexyl carbonate. Representative photoinitiators include, but are not limited to, 1-hydroxy-phenyl-ketone; benzophenone; 2-hydroxyl-2-methyl-1-phenyl-propanone; 2-hydroxyl-1-[4-(2-hydroxy)phenyl]-2-methyl-1-propanone; methylbenzoylformate; oxy-phenyl-acetic acid 2-[2-oxo-2-phenyl-acetoxy-ethoxy]-ethyl ester; oxy-phenyl-acetic 2-[2-hydroxy-ethoxy]-ethyl ester; α,α-dimethoxy-α-phenylacetophenone; 2-benzyl-2-(dimethylamino)-1-[4-(4-morpholinyl)phenyl]-1-propanone; diphenyl (2,4,6-trimethylthio)phenyl)-phosphine oxide; phosphine oxide; phenyl bis(2,4,6-trimethyl benzoyl); bis(η$^5$-2,4-cyclopentadien-1-yl)-bis[2,6-difluoro-3-(1H-pyrrol-1-yl)phenyl]titanium; and iodonium (4-methylphenyl)-[4-(2-methylpropyl) phenyl]-hexafluorophosphate. Mixtures of any two or more such initiators may also be used.

In some embodiments, the photoinitiator is a UV initiator. Illustrative UV curing initiators include, but are not limited to, 2,2-dimethoxy-2-phenylacetophenone; 2-methoxy-2-phenylacetone; benzyl-dimethyl-ketal; ammoniumpersulfate; benzophenone; ethyl benzoin ether; isopropyl benzoin ether; a-methyl benzoin ether; benzoin phenyl ether; 2,2-diethoxyacetophenone; 1,1-dichloroacetophenone; 2-hydroxy-2-methyl-1-phenylpropane-1-one; 1-hydroxycyclohexyl phenyl ketone; anthraquinone; 2-ethyl anthraquitone; 2-chloroanthraquinone; thioxantone; isopropyl thioxantone; chlorothioxantone; 2,2-chlorobenzophenone; benzyl benzoate; and benzoylbenzoate. Mixtures of any two or more such initiators may also be used.

A cure reaction promoter may also be added to the initiators to expedite cross-linking. For example, the cure reaction promoter can aid in achieving cure times of from several second to minutes at elevated temperature. Representative cure reaction promoters include radical promoters such as, but not limited to, a tertiary amine compound or a cobalt compound. Illustrative tertiary amines include, but are not limited to, N,N-dimethylaniline, N,N-diethylaniline, N,N-dimethyl-p-toluidine, N,N-dimethyl-m-toluidine, 4-N,N-dimethylamino phenethyl alcohol, 4-N,N-dimethylamino phenyl acetic acid, ethyl-4-dimethylamino benzoate, 4-N,N-dimethylaminobenzyl alcohol, 4-N,N-dimethylaminobenzyl methacrylate, and amines with electron donating substituents in the para position. Any mixture of two or more tertiary amines may also be used.

As an example, the mechanism for rapid initiation by using combination of benzoyl peroxide (BPO)/tertiary amine system is different from the conventional thermal initiation of BPO with respect to practical applications and chemical kinetics. The BPO/tertiary amine system has low activation energy and therefore it can initiate polymerization at room temperature as compared to conventional BPO decomposition, which occurs at 70° C. and above. The mechanism for the acceleration of BPO decomposition by tertiary amine starts with $S_N2$ nucleophilic displacement by the tertiary amine on the peroxide, yielding an intermediate adduct which finally forms benzoyloxy radical, benzoicacid and N-methylene radical.

In another aspect, another cross-linking polysiloxane binder system is based on the cross-linkable polymer based on a polysiloxane polymer system obtained by a cross-linking reaction between a partial oligo(ethylene oxide) group-substituted polymethylhydrosiloxane (Formula VIV and Formula X) and a crosslinker (Formula XI and XII). The first crosslinker of diallyl-terminated poly(ethylene glycol) has a molecular weight from 200 to 800.

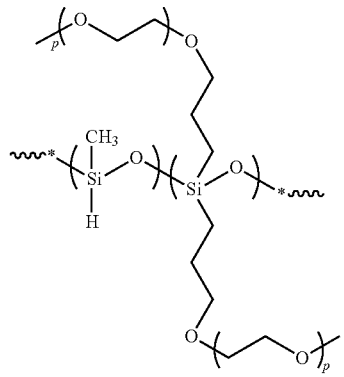

VIV

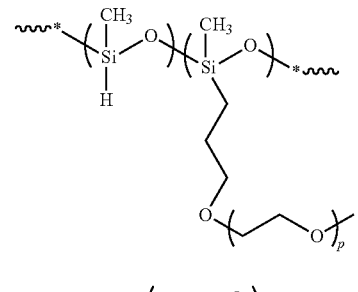

X

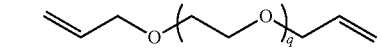

XI

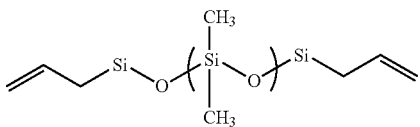

XII

The crosslinking reaction may be initiated by a platinum catalyst at elevated temperature, wherein the catalyst is a complex of Pt(0) with divinyltetramethyldisiloxane or $H_2PtCl_6$. Cross-linking reaction equations include those of Schemes 1-4. Scheme 1 is a thermal initiation of cross-linking polysiloxane as binder. Scheme 2 is a thermal initiation of cross-linking polysiloxane as binder. Scheme 3 is a thermal initiation of cross-linking polysiloxane as binder. Scheme 4 is a thermal initiation of cross-linking polysiloxane as binder.

Scheme 1

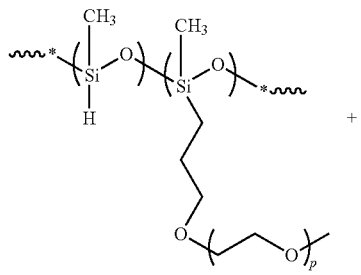

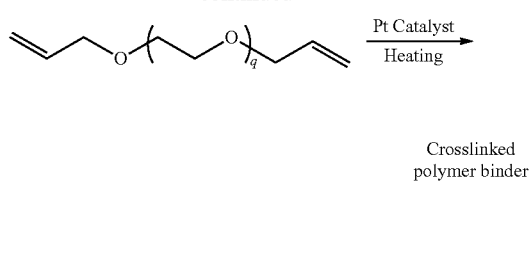
Pt Catalyst / Heating → Crosslinked polymer binder

Scheme 2

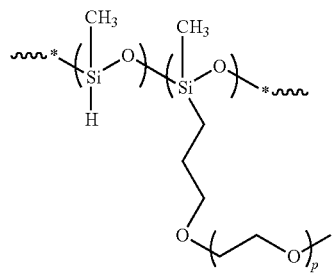

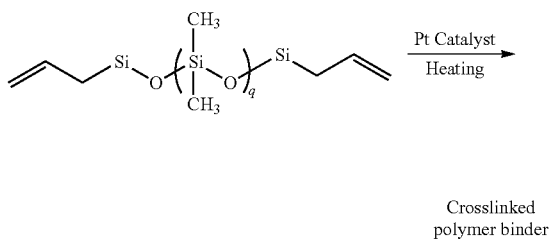
Pt Catalyst / Heating → Crosslinked polymer binder

Scheme 3

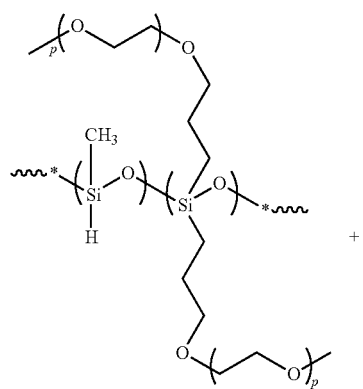

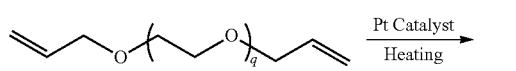
Pt Catalyst / Heating → Crosslinked polymer binder

Scheme 4

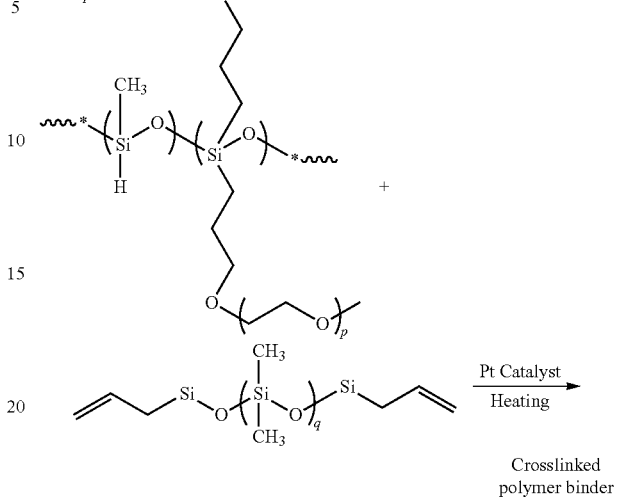
Pt Catalyst / Heating → Crosslinked polymer binder

As used herein, the following definitions of terms shall apply unless otherwise indicated.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

In general, "substituted" refers to a group, as defined below (e.g., an alkyl or aryl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, carbonyls(oxo), carboxyls, esters, urethanes, thiols, sulfides, sulfoxides, sulfones, sulfonyls, sulfonamides, amines, isocyanates, isothiocyanates, cyanates, thiocyanates, nitro groups, nitriles (i.e., CN), and the like.

Alkyl groups include straight chain and branched alkyl groups having from 1 to 20 carbon atoms or, in some embodiments, from 1 to 12, 1 to 8, 1 to 6, or 1 to 4 carbon atoms. Alkyl groups further include cycloalkyl groups. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, tert-butyl, neopentyl, isopentyl, and 2,2-dimethylpropyl groups. Representative substituted alkyl groups may be substituted one or more times with substituents such as those listed above. Where the term haloalkyl is used, the alkyl group is substituted with one or more halogen atoms.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 3 to 6, or 3 to 7. Cycloalkyl groups further include mono-, bicyclic and polycyclic ring systems, such as, for example bridged cycloalkyl groups as described below, and fused rings, such as, but not limited to, decalinyl, and the like. In some embodiments, polycyclic cycloalkyl groups have three rings. Substituted cycloalkyl groups may be substituted one or more times with, non-hydrogen and non-carbon groups as defined above. However, substituted cycloalkyl groups also include rings that are substituted with straight or branched chain alkyl groups as defined above. Representative substituted cycloalkyl groups may be mono-substituted or substituted more than once, such as, but not limited to, 2,2-, 2,3-, 2,4- 2,5- or 2,6-disubstituted cyclohexyl groups, which may be substituted with substituents such as those listed above.

Alkenyl groups include straight and branched chain and cycloalkyl groups as defined above, except that at least one double bond exists between two carbon atoms. Thus, alkenyl groups have from 2 to about 20 carbon atoms, and typically from 2 to 12 carbons or, in some embodiments, from 2 to 8, 2 to 6, or 2 to 4 carbon atoms. In some embodiments, alkenyl groups include cycloalkenyl groups having from 4 to 20 carbon atoms, 5 to 20 carbon atoms, 5 to 10 carbon atoms, or even 5, 6, 7, or 8 carbon atoms. Examples include, but are not limited to vinyl, allyl, CH=CH(CH$_3$), CH=C(CH$_3$)$_2$, —C(CH$_3$)=CH$_2$, —C(CH$_3$)=CH(CH$_3$), —C(CH$_2$CH$_3$) =CH$_2$, cyclohexenyl, cyclopentenyl, cyclohexadienyl, butadienyl, pentadienyl, and hexadienyl, among others. Representative substituted alkenyl groups may be mono-substituted or substituted more than once, such as, but not limited to, mono-, di- or tri-substituted with substituents such as those listed above.

Alkynyl groups include straight and branched chain alkyl groups, except that at least one triple bond exists between two carbon atoms. Thus, alkynyl groups have from 2 to about 20 carbon atoms, and typically from 2 to 12 carbons or, in some embodiments, from 2 to 8, 2 to 6, or 2 to 4 carbon atoms. Examples include, but are not limited to —C≡C(CH$_3$), —C≡C(CH$_2$CH$_3$), —CH$_2$C≡CH, —CH$_2$C≡C(CH$_3$), and —CH$_2$C≡C(CH$_2$CH$_3$), among others. Representative substituted alkynyl groups may be mono-substituted or substituted more than once, such as, but not limited to, mono-, di- or tri-substituted with substituents such as those listed above.

Aryl, or arene, groups are cyclic aromatic hydrocarbons that do not contain heteroatoms. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. Although the phrase "aryl groups" includes groups containing fused rings, such as fused aromatic-aliphatic ring systems (e.g., indanyl, tetrahydronaphthyl, and the like), it does not include aryl groups that have other groups, such as alkyl or halo groups, bonded to one of the ring members. Rather, groups such as tolyl are referred to as substituted aryl groups. Representative substituted aryl groups may be mono-substituted or substituted more than once. For example, monosubstituted aryl groups include, but are not limited to, 2-, 3-, 4-, 5-, or 6-substituted phenyl or naphthyl groups, which may be substituted with substituents such as those listed above.

"Alkoxy" refers to the group —O-alkyl wherein alkyl is defined herein. Alkoxy includes, by way of example, methoxy, ethoxy, n-propoxy, isopropoxy, n-butoxy, t-butoxy, sec-butoxy, and n-pentoxy.

"Amino" refers to the group —NH$_2$. "Cyano" refers to the group —CN. "Carbonyl" refers to the divalent group —C(O)— which is equivalent to —C(=O)—. "Nitro" refers to the group —NO$_2$. "Oxo" refers to the atom (=O). "Sulfonyl" refers to the divalent group —S(O)$_2$—. "Thiol" refers to the group —SH. "Thiocarbonyl" refers to the divalent group —C(S)— which is equivalent to —C(=S)—. "Hydroxy" or "hydroxyl" refers to the group —OH.

The present invention, thus generally described, will be understood more readily by reference to the following examples, which are provided by way of illustration and are not intended to be limiting of the present invention.

EXAMPLES

Example 1

Fabrication of Nanosized Silicon Anodes with Illustrative Binder. Silicon powder (98%, less than 50 nm size, from Alfa Aesar) as the active material, acetylene black (AB) as conductive agent, and a dimethylsiloxane-ethylene oxide block co-polymer having a molecular weight of 6,500 g/mol as binder were added to an egg-shaped hardened vial according to the electrode formulation of 70 wt % active material, 20 wt % AB, and 10 wt % binder. Appropriate amounts of solvent (NMP) were added to provide a slurry with a viscosity of 200 cP. A shaker was used to shake the vials at 500 shakes per min for 30 min. The slurry was then coated onto 20 µm thick copper foil. The coated copper foil was then heated to 75° C.

in a oven overnight to remove the NMP. The dry laminate was then pressed to the desired thickness of 25 μm.

Comparative Example

Fabrication of Nanosized Silicon Anodes With A Conventional Binder. An anode was prepared according to Example 1, but with the convention binder polyvinylidene fluoride (PVDF).

Example 2

Preparation Of Lithium Ion Cell Testing Vehicle And Testing Conditions. Electrodes having a 1.43 cm diameter were punched from the coated copper foils of Example 1 and the Comparative Example. Typical active-coating was 0.875 mg/cm$^2$, which corresponds to a capacity density of 1.05 mAh/g. Composite electrodes with different binders were assembled in 2032-type coin cells using a lithium foil disk as a common counter and reference electrodes. A microporous PP/PE/PP trilayer separator (Celgard 2325) was used between the electrodes. The electrolyte was 1.2M LiPF$_6$ in ethylene carbonate (EC) and ethylene methyl carbonate (EMC) (weight ratio 3:7). The cells were assembled and crimped closed in an Ar-filled glove box.

Example 3

Cell Testing Conditions. The cells from Example 2 were subjected to two "formation cycles" before normal cycling between 0.02 and 1.5V (C/3 rate). In each of the formation cycles, the Si negative electrode was discharged to 0.02 V, and then charged to 2.5V. The current used in formation cycles was 100 mA/g.

EQUIVALENTS

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

While several, non-limiting examples have been illustrated and described, it should be understood that changes and modifications can be made therein in accordance with ordinary skill in the art without departing from the invention in its broader aspects as defined in the following claims.

What is claimed is:

1. An electrode comprising a binder and an electroactive material, wherein the binder comprises a polymer comprising a linear polysiloxane or a cyclic polysiloxane, wherein the polymer is a solid polymer comprising oligo(ethylene oxide) side chains.

2. The electrode of claim 1, wherein the polymer is a cross-linked polymer.

3. The electrode of claim 2, wherein the crosslinked polymer is prepared from monomers comprising a compound of Formula III:

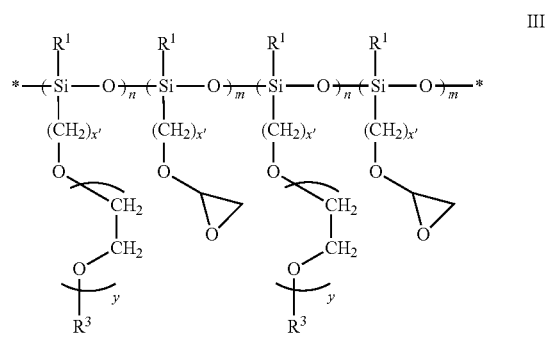

wherein:
each $R^1$ is independently an alkyl group;
$R^3$ is H or alkyl;
x' is from 0-12;
y is from 1 to 20; and
n and m represent the repeat units of the polymer, which may be in a random order.

4. The electrode of claim 3, wherein the $R^1$ is independently methyl, ethyl, or propyl; $R^3$ is H, methyl, ethyl, or propyl; x' is 2 or 3; and y is from 2 to 7.

5. The electrode of claim 2, wherein the crosslinked polymer is prepared using a crosslinking agent represented by Formula VII:

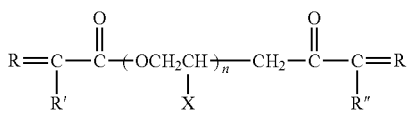

wherein:

R represents an alkyl group having 1 to 10 carbon atoms;

each of R' and R" represents H, an alkyl group having 1 to 10 carbon atoms, or an alkenyl group having 2 to 12 carbon atoms;

X is H or a methyl group; and n is 1 to 15.

6. The electrode of claim 2, wherein a crosslink density of the crosslinked polymer is prepared using a crosslink density agent represented by Formula VIII:

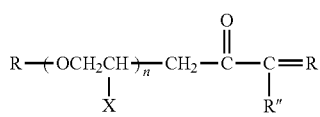

wherein:

R and R' is independently an alkyl group having 1 to 10 carbon atoms;

R" represents H, an alkyl group having 1 to 10 carbon atoms, or an alkenyl group having 2 to 12 carbon atoms;

X is H or a methyl group; and n is 1 to 15.

7. The electrode of claim 1, wherein the polymer has a molecular weight of greater than 6,000 g/mol.

8. The electrode of claim 1, wherein polymer is represented by Formula I:

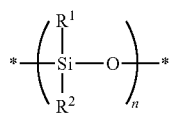

wherein:

each $R^1$ is independently an alkyl group, an epoxy group, a carbonate group, a carboxyl group, an oxalic group, or a polyether group;

each $R^2$ is independently an alkyl group, an epoxy group, a carbonate group, a carboxyl group, an oxalic group, or a polyether group;

n represents a number of repeat units in the polymer in any random order.

9. The electrode of claim 8, wherein n is from about 30 to about 1000.

10. The electrode of claim 1, wherein the polymer comprises a linear polysiloxane of Formula IA, IB, IC, ID, or IE:

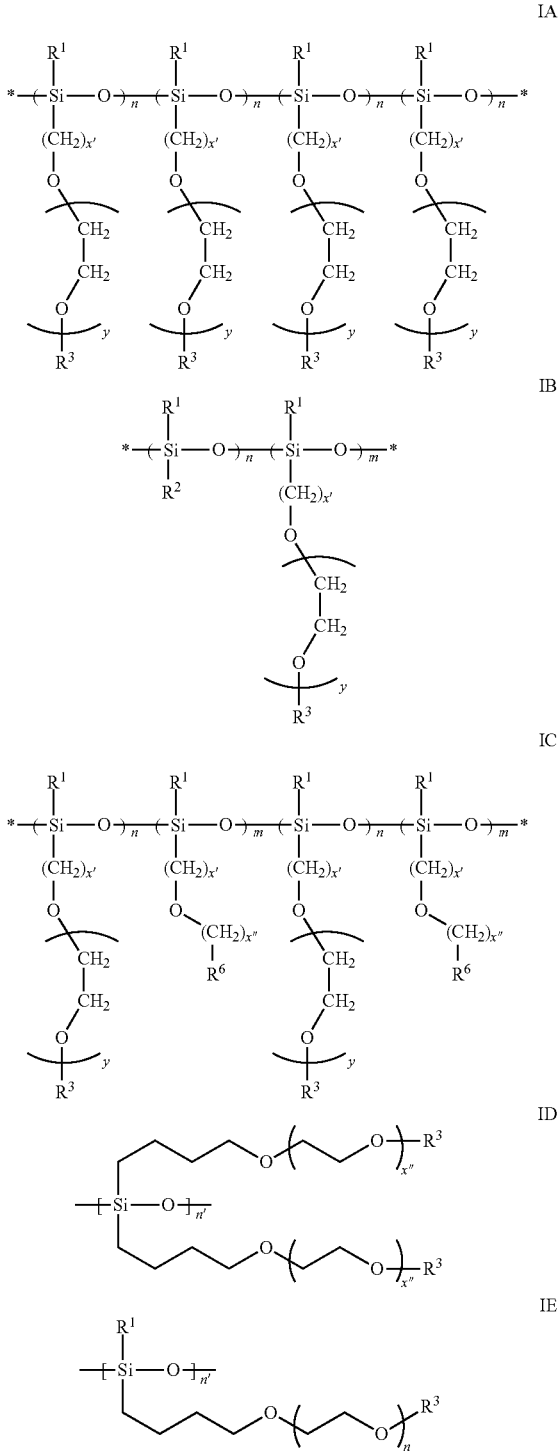

wherein:

each $R^1$ is independently an alkyl group, an epoxy group, a carbonate group, a carboxyl group, an oxalic group, or a polyether group;

$R^2$ is alkyl;

$R^3$ is H or alkyl;

$R^6$ is a cyclic carbonate;

x' is from 0 to 12;
x" is from 1 to 12;
y is from 1 to 20;
n and m represent the individual repeat units of the polymer, which may be in a random order; and
n' represents a numeral of 1 to 200.

11. The electrode of claim 10, wherein the polymer comprises a compound represented by Formula IA, wherein each $R^1$ is independently methyl, ethyl, or propyl; $R^3$ is H, methyl, ethyl, or propyl; x' is 2 or 3; and y is from 2 to 7.

12. The electrode of claim 10, wherein $R^1$ is methyl; $R^3$ is methyl; x' is 3; and y is 3.

13. The electrode of claim 10, wherein the polymer comprises a compound represented by Formula IB, wherein each $R^1$ is independently methyl, ethyl, or propyl; $R^2$ is independently methyl, ethyl, or propyl; $R^3$ is H, methyl, ethyl, or propyl; x' is 2 or 3; and y is from 2 to 7.

14. The electrode of claim 13, wherein $R^1$ and $R^2$ are methyl; $R^3$ is methyl; x' is 3; and y is 3.

15. The electrode of claim 10 wherein the polymer comprises a compound represented by Formula IC, wherein each $R^1$ is independently methyl, ethyl, or propyl; each $R^6$ is 1,3-dioxolane-2-one; $R^3$ is H, methyl, ethyl, or propyl; x' is 2 or 3; x" is 1 to 4; and y is from 2 to 7.

16. The electrode of claim 15, wherein $R^1$ and $R^2$ are methyl; $R^3$ is methyl; x' is 3; x" is 1; and y is 2.

* * * * *